(12) United States Patent
Mizuno et al.

(10) Patent No.: US 8,120,667 B2
(45) Date of Patent: Feb. 21, 2012

(54) VIDEO SIGNAL PROCESSING APPARATUS WITH OUTLINE EMPHASIS CONTROL SECTION

(75) Inventors: Shinjiro Mizuno, Osaka (JP); Syouzou Fujii, Osaka (JP); Kiyofumi Abe, Osaka (JP)

(73) Assignee: Panasonic Corporation, Osaka (JP)

( * ) Notice: Subject to any disclaimer, the term of this patent is extended or adjusted under 35 U.S.C. 154(b) by 448 days.

(21) Appl. No.: 12/356,759

(22) Filed: Jan. 21, 2009

(65) Prior Publication Data

US 2009/0268064 A1   Oct. 29, 2009

(30) Foreign Application Priority Data

Jan. 22, 2008 (JP) ................................. 2008-011250

(51) Int. Cl.
*H04N 5/228* (2006.01)
*H04N 5/217* (2011.01)

(52) U.S. Cl. ....................... 348/222.1; 348/241; 358/463

(58) Field of Classification Search ............... 348/222.1, 348/241, 252, 362
See application file for complete search history.

(56) References Cited

U.S. PATENT DOCUMENTS

| 4,748,677 | A | * | 5/1988 | Yokomizo ..................... 382/270 |
| 4,979,043 | A | | 12/1990 | Suzuki et al. |
| 7,746,505 | B2 | * | 6/2010 | Lim .............................. 358/3.27 |
| 2001/0048474 | A1 | | 12/2001 | Yamazaki et al. |
| 2005/0162620 | A1 | * | 7/2005 | Taguchi et al. .................. 353/69 |
| 2005/0185223 | A1 | * | 8/2005 | Takahashi et al. ........... 358/3.26 |
| 2006/0221266 | A1 | * | 10/2006 | Kato et al. ..................... 348/838 |
| 2007/0132859 | A1 | * | 6/2007 | Inoue et al. ................. 348/222.1 |
| 2008/0018937 | A1 | * | 1/2008 | Kimakura ...................... 358/3.1 |
| 2009/0316024 | A1 | * | 12/2009 | Noh .............................. 348/252 |
| 2011/0037870 | A1 | * | 2/2011 | Katagiri et al. ............ 348/222.1 |

FOREIGN PATENT DOCUMENTS

JP   02-063271   3/1990
JP   2002-064745   2/2002

* cited by examiner

*Primary Examiner* — Hung Lam
(74) *Attorney, Agent, or Firm* — Renner, Otto, Boisselle & Sklar, LLP

(57) ABSTRACT

A video signal processing apparatus includes: an imaging section for imaging a subject to generate a video signal; an outline emphasis processing section for emphasizing an outline portion within the imaged image, the outline emphasis processing section detecting the outline portion based on the video signal which is output from the imaging section and emphasizing the outline portion by using an externally-input outline emphasis control signal; an imaging control section for generating at least one imaging control signal for controlling an imaging operation of the imaging section; and an outline emphasis control section for generating an outline emphasis control signal for determining a level of emphasizing the outline portion in accordance with the at least one imaging control signal, and transmitting the outline emphasis control signal to the outline emphasis processing section. The video signal processing apparatus is able to perform an appropriate outline emphasis process under any imaging condition and provide a good image quality.

10 Claims, 11 Drawing Sheets

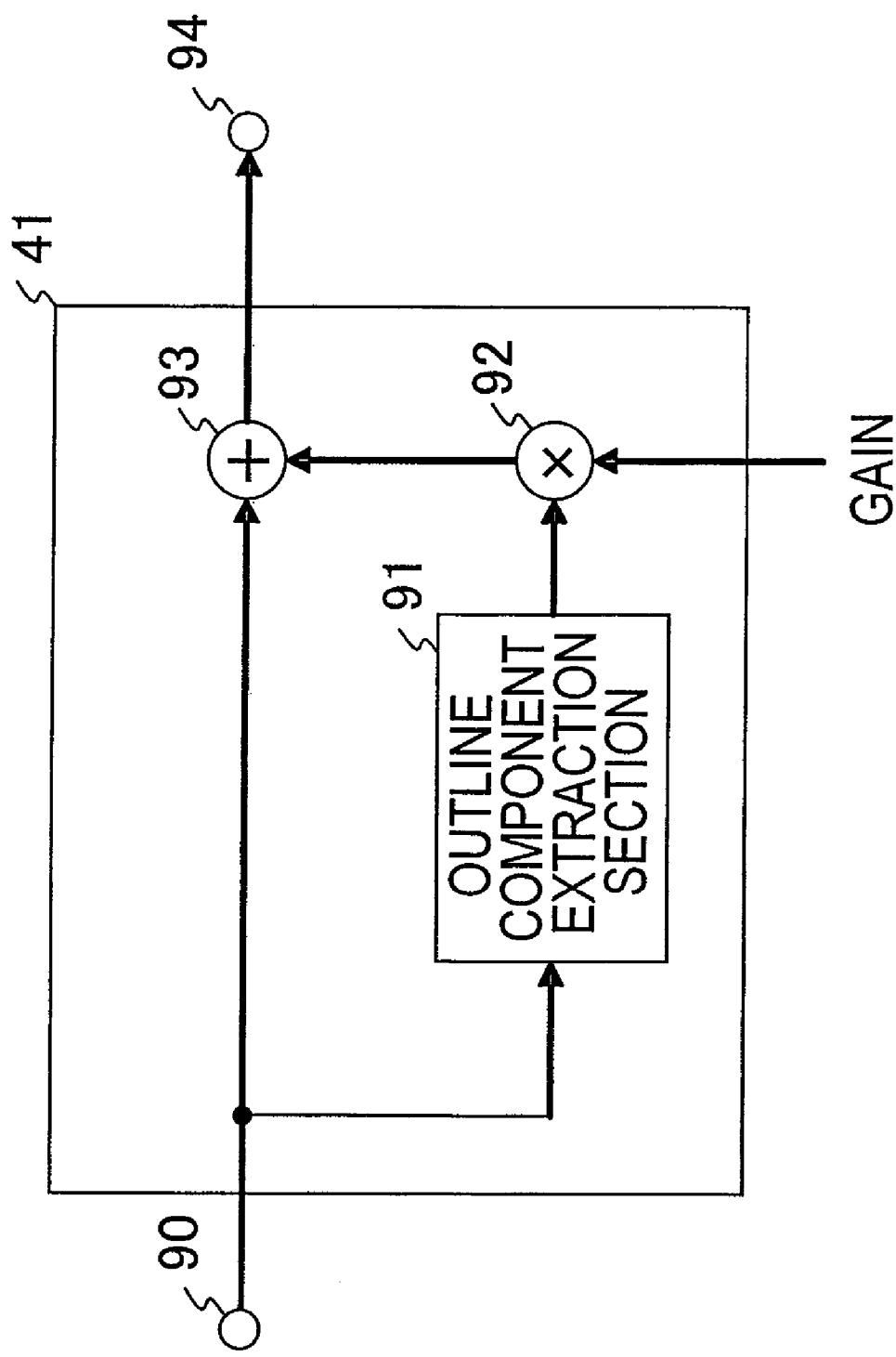

VIDEO SIGNAL PROCESSING APPARATUS WITH OUTLINE EMPHASIS CONTROL SECTION

BACKGROUND OF THE INVENTION

1. Field of the Invention

The present invention relates to video signal processing. More specifically, the present invention relates to an outline emphasis process for a video signal, which is used in digital camcorders and the like.

2. Description of the Related Art

Generic imaging apparatuses such as digital camcorders include an imaging means, a video signal processing means, and an encoding means.

Through imaging optics, the imaging means allows subject light (light from a subject) to be converged on a solid-state imaging device for a photoelectric conversion, and generates a video signal. To the video signal which has been obtained by the imaging means, the video signal processing means applies various kinds of signal processing for improving the image quality. Then, by an encoding method such as MPEG2, the encoding means applies a data amount compression to the video signal which has been subjected to the signal processing.

Since the conditions for shooting a subject may be various, the video signal processing means of an imaging apparatus performs various kinds of control for stably obtaining a good image quality under any shooting condition. The examples are aperture, shutter speed, focus, handshake correction, and zoom operation, which are controlled for the imaging means. An automatic gain control (AGC) is also performed. Furthermore, for an improved image quality, the video signal processing means also performs a gamma correction process, an outline emphasis process, and the like.

For example, Japanese Laid-Open Patent Publication No. 2-63271 and Japanese Laid-Open Patent Publication No. 2002-64745 disclose a device which may typically be a camera.

FIG. 10 is a construction diagram showing the construction of a conventional imaging apparatus.

The imaging apparatus includes an imaging section 20, various control sections 21 to 25, an imaging control section 42, and a video signal processing section 44.

The subject light which has entered imaging optics 19 is converged onto the imaging device through lenses 10, 11, 13, and 14, and an iris 12 of the imaging optics 19. Then, the subject light is converted into an analog video signal by the imaging device 15, a CDS circuit 16 and an AGC circuit 17, and is further converted into a digital video signal by an A/D converter 18.

Next, the converted digital video signal is input to a video signal processing section 44. A gamma correction circuit 40 of the video signal processing section 44 applies a gamma correction process to the input digital video signal. Next, an outline emphasis processing section 41 applies an outline emphasis process to the video signal that has experienced gamma correction. Specifically, the outline emphasis processing section 41 multiplies the video signal which has been subjected to the gamma correction process by an externally-received gain value, thus amplifying the outline component signal to an appropriate level. The outline emphasis processing section 41 outputs the resultant outline component signal to the subsequent stages via an output terminal 43.

For the aforementioned processes by the imaging optics 19, the imaging control section 42 controls the various control sections 21 to 25. Specifically, the imaging control section 42 controls a zoom control section 21, an iris control section 22, an OIS (Optical Image Stabilizer) control section 23, a shutter control section 24, and an AGC control section 25. Through such control, a stable image quality is automatically obtained under any shooting condition.

The conventional outline emphasis processing method has problems in that: it is impossible to perform an effective outline emphasis process that supports various shooting conditions; a balance cannot be established between deterioration in image quality due to encoding and improvement in image quality due to outline emphasis; and use of a plurality of pieces of control information adds to the circuit scale, e.g., memory, thus increasing the cost. Specifically, they are as follows.

As an first example, the aforementioned problems become significant when the illuminance of the subject is lowered.

Firstly, when the illuminance of the subject that is input to the imaging device 15 is bright, a video image having a high contrast in the outline portion is obtained, so that the effect of outline emphasis will be eminent. Moreover, since there are many high-luminance regions within the screen, a good signal to noise (S/N) ratio is also obtained. Thus, even if a large outline emphasis gain value is set, there is no unwanted amplification of noise, and it is possible to achieve an improved image quality.

On the other hand, the S/N ratio will gradually be deteriorated as the illuminance decreases. In particular, noise will become conspicuous in flat portions that are dark. However, during the outline emphasis process, a relatively large gain value is universally applied irrespective of the illuminance, by which the outline component signal is amplified. This will also allow the noise component to be amplified, thus resulting in a very uncomely image quality. Moreover, when the illuminance is low, contrast will lower in the outline portion; therefore, even if an outline emphasis process is performed, its effect will not be eminent.

As a second example, when a motion occurs in the subject due to a motion of the imaging optics or the imaging apparatus main body such as zoom or panning, the aforementioned problems will also be significant.

Firstly, in a still shooting where the imaging optics and the imaging apparatus main body are not moving, it is easy to focus on the subject and the outline portion will be clearly imaged. If an outline emphasis process is then performed, the outline will become emphasized furthermore clearly, whereby an improved image quality can be achieved.

However, when shooting is conducted while panning the camera or zooming, the subject will be moving so that it is difficult to attain focus, and the outline portion will be blurred. In other words, there is less high frequency component, so that the effect of outline emphasis will not be eminent even if an outline emphasis process is performed.

Furthermore, there is also a fear of emphasizing unwanted signal components. For example, in the case where a three-dimensional noise reduction circuit for noise reduction (not shown) is provided, unwanted components that do not belong to the subject may appear near an outline portion that has moved, e.g., afterimage or pseudo outline. The outline emphasis process will also emphasize such unwanted component at the same time. Furthermore, in a low-illuminance situation where the S/N ratio is bad, only the noise component will be emphasized, thus resulting in a deterioration in the image quality.

In Japanese Laid-Open Patent Publication No. 2-63271 above, an outline emphasis method for reducing deterioration in the image quality under a low illuminance is proposed. This is a technique of controlling an outline emphasis factor in synchronization with an AGC gain value that is applied to the AGC circuit 17.

Although this can address problems under a very low illuminance, such as when an intensive outline emphasis process will be performed by the AGC circuit 17, it still leaves some problems in the case of a illuminance which is not so low as the illuminance at which the AGC circuit 17 will begin operating but which is objectively quite low.

Even before AGC control is begun, an illuminance adjustment in the imaging section is being performed by controlling the aperture level, shutter speed, etc., of the iris. For example, when the iris is open with a shutter speed of 1/60 seconds, the illuminance is so low that there will be significant lowering of resolution and deterioration in the S/N ratio. Thus, an improvement with respect to a single condition will leave problems as to other conditions, and it is necessary to totally consider the conditions for a plurality of pieces of camera control information.

As an example of using a plurality of pieces of camera control information, there exists a technique which is disclosed in Japanese Laid-Open Patent Publication No. 2002-64745, supra. Under the method shown in this document, setting tables are retained in memory such that parameter sets will be loaded according to case handling of each parameter based on a plurality of conditions. However, with this construction, the amount of tables will increase with an increase in the number of pieces of imaging control information that are used, thus inducing a considerable increase in cost, e.g., increased memory amount.

Moreover, performing an outline emphasis process will lead to yet other problems.

For example, when moving pictures are shot with a camcorder, a video signal will be encoded, and written to a storage medium as moving picture data. If an outline emphasis process is performed before an encoding process, the block noise may increase during an encoding process which is based on this process result, thus resulting in a deterioration in the image quality. It may be said that the outline emphasis process which is meant to provide a better image quality (sharpness) is serving as a cause for a subsequent deterioration in image quality, thus producing a converse effect.

Hereinafter, with reference to FIG. 11, the reasons for the increased block noise will be described. FIG. 11 shows the construction of an encoding section 81 of a conventional imaging apparatus. As an example, a construction which performs encoding by the MPEG2 method is illustrated.

Hereinafter, a flow of processing that is performed in the encoding section 81 will be described.

First, a video signal is input at an input terminal 80. It is assumed that the input video signal is a video signal that has experienced correction.

Based on a predetermined gain value, the outline emphasis processing section 41 applies an outline emphasis process to the video signal. The video signal which has been subjected to the outline emphasis is retained in a sorting memory 51.

The sorting memory 51 outputs encoded images which are sorted in the order of encoding. From an encoded image which is output from the sorting memory 51 and a reference image which is output from a reference image memory 52, a motion-compensated prediction section 53 performs a motion compensation, and generates a predictable image. A subtracter 54 determines an image difference between this predictable image and the encoded image, and outputs it to a DCT circuit 55. The image difference is subjected to an orthogonal transform by the DCT circuit 55, and is quantized by a quantization section 56 according to a quantization parameter which is supplied from a rate control section 61. The result thereof is supplied to a variable-length coding section 60, and also to an inverse quantization section 57. The data which is fed to the variable-length coding section 60 is variable-length encoded, and recorded onto a storage medium 82. On the other hand, the data which is fed to the inverse quantization section 57 is inverse-quantized according to the aforementioned quantization parameter, subjected to an inverse orthogonal transform by an inverse DCT circuit 58, added up with the aforementioned predictable image, and is stored to the reference image memory. Note that only images which are selected for the reference image are stored to the reference image memory.

The rate control section 61 controls the level of quantization so that the encoded data will fit within the target recording bitrate that has been set. The control of quantization level is performed by changing the size of the quantization parameter.

The information amount of an input image is always fluctuating incessantly. Generally speaking, an image having many flat portions and little motion has a small information amount, whereas a complicated image having many outline portions or an image having a lot of motion has a large information amount. In order to fit an image having a large information amount within a predetermined recording bitrate, quantization must be performed with a greater quantization parameter than in the case of fitting an image having a small information amount within the same recording bitrate. As a result, block noises due to increased quantization errors will become significant.

The outline emphasis process by the outline emphasis processing section 41 increases the signal level of the high frequency component. The end result of this is that the high frequency component to be eliminated through the encoding process is less likely to be eliminated, and will remain in abundance. Then, the encoding section will act to further increase the quantization parameter so as to be commensurate with the target recording bitrate.

Thus, even though an effect of improving the sharpness through an outline emphasis process is being expected, a converse effect will occur in that the block noise is increased and the image quality is deteriorated. This phenomenon becomes particularly significant when the recording bitrate is too low relative to the information amount of the image.

Moreover, the rate control section 61 is measuring the resultant code amount for each encoded image, in order to perform a rate control. Then, in the case of performing a variable rate control (VBR), when the image information amount is increased, not a control of merely increasing the quantization parameter is performed, but a control of slightly increasing the quantization parameter while also permitting the resultant code amount to somewhat exceed the recording bitrate is performed. Therefore, the level of change in the image quality due to encoding (the influence of deterioration in image quality) will be manifested in two parameters, i.e., the quantization parameter and the amount of increase in the resultant code.

Moreover, in the case where a quantization control is performed in accordance with the magnitude of a cumulative error amount, which is a difference between the recording capacity that is consumed at the target recording bitrate and the recording capacity that is consumed at the actually-occurring code amount, the resultant code amount will be limited based on the cumulative error amount. Therefore, the level of deterioration in image quality will also be manifested in another parameter, i.e., the cumulative error amount.

Also, the image quality is naturally a function of how high the target recording bitrate is. The reason is that the aforementioned increase in block noise and consequent deterioration in image quality will be significant when the recording bitrate is too low relative to the information amount of the image. Therefore, the level of deterioration in image quality is also manifested in another parameter, i.e., the target recording bitrate.

As described above, the image quality cannot be improved through an outline emphasis process alone, and the influences on various parameters must also be taken into consideration.

SUMMARY OF THE INVENTION

An objective of the present invention is to perform an appropriate outline emphasis process under any imaging condition and/or any encoding condition and provide a good image quality.

Therefore, a video signal processing apparatus according to the present invention comprises: an imaging section for imaging a subject to generate a video signal; an outline emphasis processing section for emphasizing an outline portion within the imaged image, the outline emphasis processing section detecting the outline portion based on the video signal which is output from the imaging section and emphasizing the outline portion by using an externally-input outline emphasis control signal; an imaging control section for generating at least one imaging control signal for controlling an imaging operation of the imaging section; and an outline emphasis control section for generating an outline emphasis control signal for determining a level of emphasizing the outline portion in accordance with the at least one imaging control signal, and transmitting the outline emphasis control signal to the outline emphasis processing section.

The outline emphasis control section may include: parameter determination sections for generating outline emphasis parameters respectively corresponding to the at least one imaging control signal; and a selection section for, from among the outline emphasis parameters, selecting an outline emphasis parameter having characteristics that cause a weakest level of emphasizing the outline portion, and generating the outline emphasis parameter as the outline emphasis control signal.

The imaging control section may generate as the imaging control signal as a signal for controlling one or more of a zoom position, a shutter speed, an aperture value, an automatic gain value, an amount of move of an imaging apparatus main body.

Another video signal processing apparatus according to the present invention comprises: an outline emphasis processing section for emphasizing an outline portion within an image, the outline emphasis processing section detecting the outline portion based on a video signal and outputting a video signal in which the outline portion is emphasized by using an externally-input outline emphasis control signal; an encoding section for applying a low bit rate coding to the video signal; and an outline emphasis control section for generating an outline emphasis control signal for changing a level of emphasizing the outline portion in accordance with at least one kind of encoding information which represents an encoding state of the encoding section.

The outline emphasis control section may include: parameter determination sections for generating outline emphasis parameters respectively corresponding to the at least one kind of encoding information; and a selection section for, from among the outline emphasis parameters, selecting an outline emphasis parameter having characteristics that cause a weakest level of emphasizing the outline portion, and generating the outline emphasis parameter as the outline emphasis control signal.

The encoding section may output at least one kind of encoding information among the followings: a quantization parameter, a code amount, a cumulative error amount of a resultant code amount relative to a target code amount, and a target bitrate value.

The video signal processing apparatus may further comprise an encoding section for applying a low bit rate coding to the video signal, wherein, the parameter determination sections further generate the outline emphasis parameters for changing a level of emphasizing the outline portion in accordance with the at least one kind of encoding information representing an encoding state of the encoding section.

The outline emphasis processing section may add to the video signal a product of multiplying a component of the video signal that corresponds to the detected outline portion by a gain value; and the outline emphasis control section may select a smallest gain value among the gain values respectively generated by the parameter determination sections.

The outline emphasis processing section may include a filter for detecting the outline portion based on the video signal and filter factors; the outline emphasis processing section may add to the video signal a product of multiplying a component of the video signal that corresponds to the detected outline portion by a gain value; and the outline emphasis control section may generate as the outline emphasis signal a filter factor that causes a weakest level of outline emphasis.

The at least one imaging control signal may be a zoom position signal; the imaging control section may output the zoom position signal to the imaging section in order to control a zoom operation of the imaging section; and the parameter determination section may calculate a current zooming speed from the zoom position signal, and generate an outline emphasis parameter which lessens the level of outline emphasis as the zooming speed is faster.

The at least one imaging control signal may be an amount of move of an apparatus main body; the imaging control section may output the amount of move signal of the apparatus main body to the imaging section in order to control a handshake correction operation of the imaging section; and the parameter determination section may generate an outline emphasis parameter which lessens the level of outline emphasis as the amount of move of the apparatus main body is faster.

The at least one imaging control signal may be an aperture value of an iris; the imaging control section may output the aperture value to the imaging section in order to control an aperture level of the iris of the imaging section; and the parameter determination section may generate an outline emphasis parameter which lessens the level of outline emphasis as the aperture value is closer to open.

The at least one imaging control signal may be a shutter speed value; the imaging control section may output a shutter speed value to the imaging section in order to control a shutter speed of the imaging section; and the parameter determination section may generate an outline emphasis parameter which lessens the level of outline emphasis as the shutter speed is slower.

The at least one imaging control signal may be an automatic gain value; the imaging control section may output an automatic gain value to the imaging section in order to control an imaging section of the automatic gain amount; and the parameter determination section may generate an outline emphasis parameter which lessens the level of outline emphasis as the automatic gain value is larger.

The at least one kind of encoding information may be a quantization parameter; the encoding section may output to the parameter determination section the quantization parameter used for encoding; and the parameter determination section may generate an outline emphasis parameter which lessens the level of outline emphasis as the quantization parameter is larger.

The at least one kind of encoding information may be a code amount; the encoding section may output to the parameter determination section the code amount occurring from encoding; and the parameter determination section may generate an outline emphasis parameter which lessens the level of outline emphasis as the code amount is larger.

The at least one kind of encoding information may be a cumulative error amount of a resultant code amount relative to a target code amount; the encoding section may output the cumulative error amount to the parameter determination section; and the parameter determination section may generate an outline emphasis parameter which lessens the level of outline emphasis as the cumulative error amount is larger.

The at least one kind of encoding information may be a target bitrate value; the encoding section may output the target bitrate value to the parameter determination section; and the parameter determination section may generate an outline emphasis parameter which lessens the level of outline emphasis as the target bitrate value is smaller.

According to the present invention, by using imaging control information, it is possible to perform an optimum outline emphasis process under various shooting conditions. Moreover, by using encoding information, an appropriate outline emphasis process can be performed without inducing deteriorations in image quality due to encoding. Moreover, it is possible to perform an optimum outline emphasis process that supports any imaging condition and encoding state. Therefore, it is possible to always attain an improvement in image quality. Moreover, since this can be realized by a simple method with a very small processing amount, it can be introduced without a cost increase in circuit scale, memory amount, and the like.

BRIEF DESCRIPTION OF THE DRAWINGS

FIG. 2 is a diagram showing the detailed construction of an outline emphasis processing section 41.

DETAILED DESCRIPTION OF PREFERRED EMBODIMENTS

Hereinafter, with reference to the attached drawings, embodiments of the video signal processing apparatus according to the present invention will be described.

Embodiment 1

Figure 1:
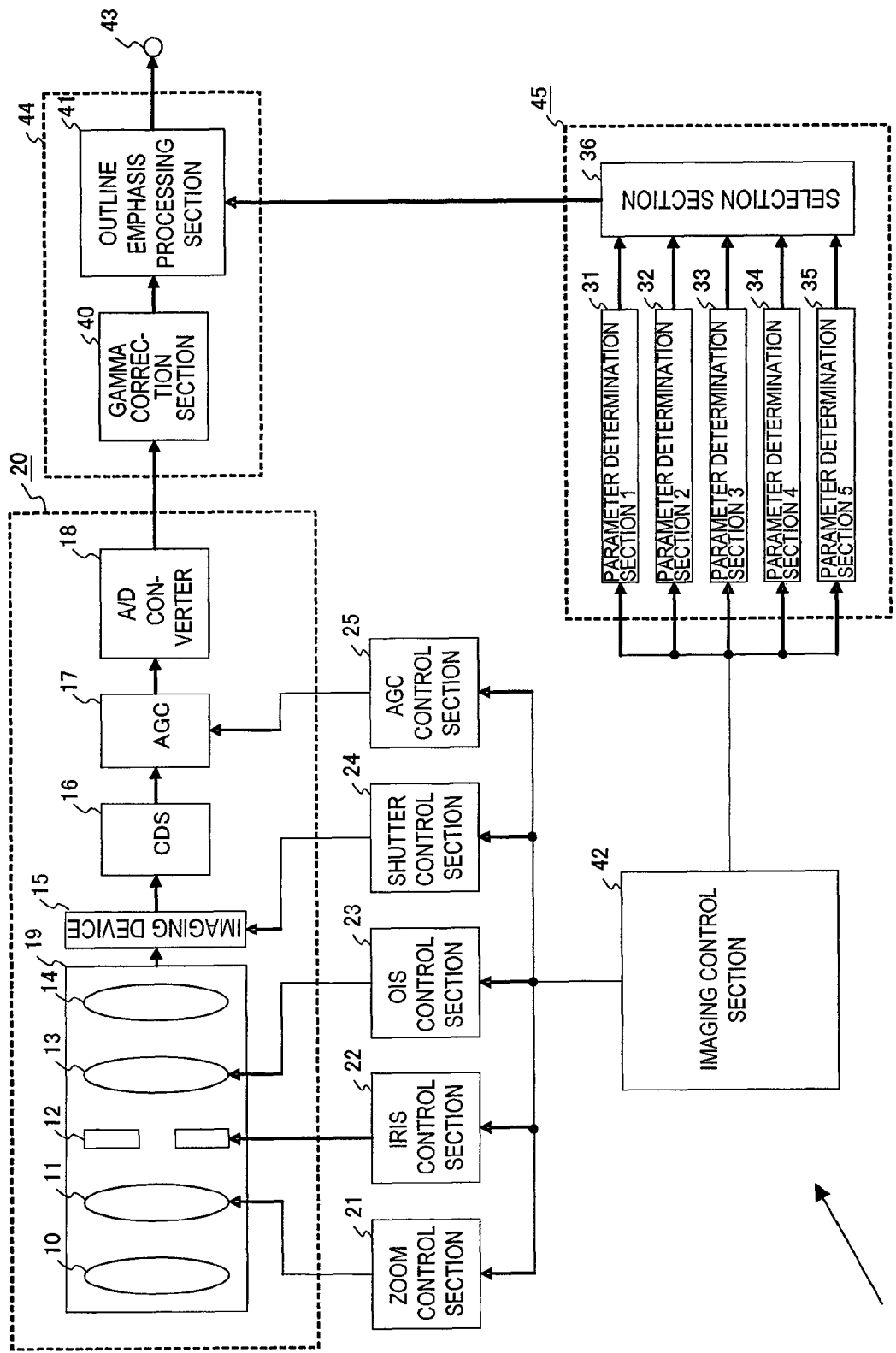
FIG. 1 is a block diagram showing the construction of a video signal processing apparatus 100 according to Embodiment 1.

FIG. 1 is a block diagram showing the construction of a video signal processing apparatus 100 according to the present embodiment.

The video signal processing apparatus 100 is a digital still camera or a camcorder, for example. However, FIG. 1 does not show all constituents of a generic digital still camera or camcorder. In addition to the constituents in FIG. 1, a circuit for applying a compression encoding process to a video signal, an input/output circuit for recording it onto a storage medium, a display circuit for displaying a video image that has been shot, and the like may be provided, for example. The description of such generic constituents will be omitted.

The video signal processing apparatus 100 includes an imaging section 20, various control sections 21 to 25, an imaging control section 42, an output terminal 43, a video signal processing section 44, and an outline emphasis control section 45.

The imaging section 20 includes imaging optics 19, an imaging device 15, a CDS circuit 16, an AGC circuit 17, and an A/D converter 18. The imaging optics 19 include a fixed lens 10, a zoom lens 11, an iris 12, a lens 13 for optical handshake correction, and an focusing lens 14, for example.

Moreover, the signal processing section 44 includes a gamma correction circuit 40 and an outline emphasis processing section 41.

The various control sections 21 to 25 are: a zoom control section 21, an iris control section 22, an OIS (Optical Image Stabilizer) control section 23, a shutter control section 24, and an AGC control section 25.

The outline emphasis control section 45 includes parameter determination sections 31 to 35 and a selection section 36.

Hereinafter, the functions of the respective constituent elements will be described in detail.

Subject light which has passed through the imaging optics 19 is converged onto the light-receiving surface of the imaging device 15, and converted to an electrical signal by the imaging device 15, whereby a video signal is generated. The video signal is input to the CDS circuit 16 and subjected to a correlated double sampling, and thereafter amplified by the AGC circuit 17 to an appropriate level, subjected to an A/D conversion by the A/D converter 18, and converted to a digital video signal.

At the time of the aforementioned shooting, the imaging control section 42 controls a plurality of constituent elements within the imaging section 20, such as the imaging optics 19, the imaging device 15, and the AGC circuit 17. Hereinafter, six main operations of the imaging control section 42 will be described.

Firstly, the imaging control section 42 activates the zoom lens 11 in accordance with a zooming operation by the user, thus realizing a zoom shooting. To the zoom control section 21, the imaging control section 42 supplies zoom position information for specifying a position or an amount of move of the zoom lens 11, for example. In this manner, the zoom control section 21 drives the zoom lens 11, whereby zoom control is realized.

Secondly, the imaging control section 42 measures the light amount of the subject to change the aperture level of the iris 12, thus enabling shooting at an optimum exposure. To the iris control section 22, the imaging control section 42 supplies aperture level information. Thus, aperture control of the iris is realized.

Thirdly, the imaging control section 42 calculates an amount of handshake based on a result of detecting the amount of move of the main body of the video signal processing apparatus 100, and controls the lens 13 for optical handshake correction so as to cancel the amount of handshake. For this control, the imaging control section 42 supplies information of the amount of move of the main body of the video signal processing apparatus 100 or correction amount to the OIS control section 23. Note that, as for the amount of move of the main body of the video signal processing apparatus 100, an angular velocity sensor may be separately provided in the device, for example, or a motion vector amount of the video signal may be calculated. Moreover, in the case of shooting while intentionally moving the main body of the video signal processing apparatus 100, e.g., panning or tilting, the amount of move of the main body of the video signal processing apparatus 100 may be supplied to the OIS control section 23 so as not to perform handshake correction, or this may be taken into consideration when the imaging control section 42 calculates the correction amount.

Fourthly, the imaging control section 42 controls the light amount integration time of the imaging device 15, thus controlling the luminance of the subject that is imaged. This control is called electronic shutter control. For this electronic shutter control, the imaging control section 42 sends shutter speed information to the shutter control section 24. Note that, in the case where a mechanical shutter (not shown) is provided in front of the imaging device 15 (at a position on the light incident side), the imaging control section 42 performs shutter speed control also for the mechanical shutter.

Fifthly, the imaging control section 42 controls the AGC circuit 17 to amplify the video signal level. As the illuminance of the subject decreases, it becomes more necessary to amplify the signal level of the video signal. Therefore, the imaging control section 42 applies a relatively large automatic gain value (AGC gain value) to the AGC control section 25. Conversely, as the illuminance of the subject increases, it becomes less necessary to amplify the signal level of the video signal, and therefore a relatively small AGC gain value is applied to the AGC control section 25.

Sixthly, the imaging control section 42 controls the focusing lens 14 to allow light from the subject to be converged on the imaging device 15. In other words, the subject is focused on.

The imaging control section 42 is always performing such plural kinds of imaging operation control. As a result, under any shooting condition, a stable image quality is automatically obtained.

The video signal processing section 44 receives a digital video signal, and subjects it to a gamma correction process. Since the gamma correction process is widely known, the description thereof will be omitted.

The outline emphasis processing section 41 performs an outline emphasis process for the video signal that has experienced gamma correction. Herein, the outline emphasis processing section 41 is receiving a gain value for outline emphasis from the outline emphasis control section 45 described later, and multiplies the video signal that has experienced correction by this gain value. As a result, the outline component signal is amplified. The outline emphasis processing section 41 outputs the resultant outline component signal to subsequent stages via the output terminal 43.

FIG. 2 shows the detailed construction of the outline emphasis processing section 41. The outline emphasis processing section 41 includes an outline component extraction section 91 and an adder 93.

The video signal which is input from an input terminal 90 is input to the outline component extraction section 91 and the adder 93. Then, the outline component extraction section 91 extracts a high frequency component from the video signal, and inputs it to a multiplier 92 as an outline component signal. The outline component signal is a video signal which corresponds to the outline portions of a subject or the like within the image.

The multiplier 92 multiplies the outline component signal by a gain value which is received from the outline emphasis control section 45, thereby amplifying the outline component signal. The amplified outline component signal is added up with the input signal by the adder 93, and output from an output terminal 94. The output video signal is a video signal which has experienced an outline emphasis process. Note that the output terminal 94 is connected to the output terminal 43 described earlier.

Hereinafter, the operation of the video signal processing apparatus 100 thus constructed will be described.

In order to control the respective constituent elements of the imaging section 20, the imaging control section 42 is outputting various imaging control signals. The various imaging control signals are, as described earlier, zoom position information, aperture value information, amount-of-move information of the main body of the video signal processing apparatus 100 for handshake correction, shutter speed information, and AGC gain value information. These imaging control signals are supplied also to the outline emphasis control section 45 in parallel.

The selection section 36 of the outline emphasis control section 45 selects and outputs one of the parameters determined by the parameter determination sections 31 to 35. The destination for output is the signal processing section 44. The respective functions of the parameter determination sections 31 to 35 are as follows. Note that the information which is used by the parameter determination sections 31 35 for determining a gain value is obtained based on a signal which is output from the imaging control section 42.

In synchronization with the zooming speed, the first parameter determination section 31 calculates an appropriate outline emphasis gain value (parameter). The zooming speed can be determined by measuring the change over time of the zoom position information.

Figure 3A:
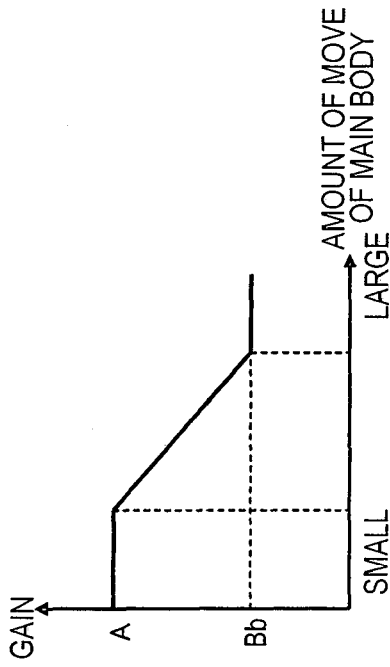
FIG. 3A is a diagram showing a relationship between the zooming speed and the gain value, which is retained in a first parameter determination section 31.

FIG. 3A shows a relationship between the zooming speed and the gain value, which is retained in the first parameter determination section 31. The first parameter determination section 31 determines an outline emphasis gain value so that the gain value decreases as the zooming speed increases.

The reason thereof is as follows. As the zooming speed increases, it becomes more likely that an image that has been shot has blurred outline portions. Since there is less high frequency component in the image in such cases, even if an outline emphasis process is performed, its effect will not be eminent. Moreover, in poor S/N ratio situations, or in the case where pseudo outlines appear near the outlines, unwanted components such as noise and pseudo outlines may be emphasized. This is why it is ensured that the outline emphasis gain value decreases as the zooming speed increases.

The second parameter determination section 32 calculates an outline emphasis gain value in synchronization with an amount of move of the main body. The amount-of-move information of the main body is a signal for OIS control, which is output from the imaging control section 42.

Figure 3B:
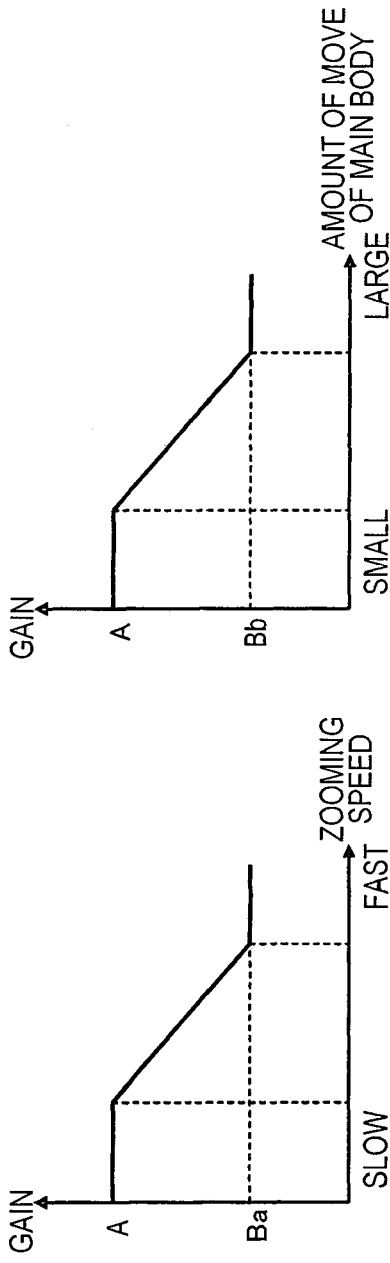
FIG. 3B is a diagram showing a relationship between the amount of move of the main body of the video signal processing apparatus 100 and the gain value, which is retained in a second parameter determination section 32.

FIG. 3B shows a relationship between the amount of move of the main body of the video signal processing apparatus 100 and the gain value, which is retained in the second parameter determination section 32. The second parameter determination section 32 determines an outline emphasis gain value so that the gain value decreases as the amount of move of the main body increases.

The reason thereof is that, as in the case of zooming, it becomes more likely for the image to be blurred as the amount of move of the main body of the video signal processing apparatus 100 increases. Thus it is ensured that the outline emphasis gain value decreases as the amount of move of the main body increases.

The third parameter determination section 33 calculates an outline emphasis gain value in synchronization with an aperture value.

Figure 3C:
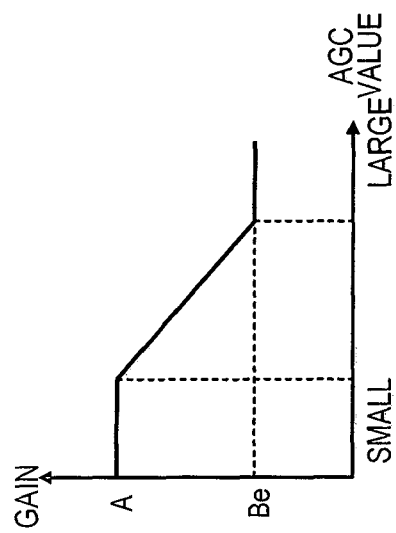
FIG. 3C is a diagram showing a relationship between the aperture value and the gain value, which is retained in a third parameter determination section 33.

FIG. 3C shows a relationship between the aperture value and the gain value, which is retained in the third parameter determination section 33. The third parameter determination section 33 determines an outline emphasis gain value so that the gain value decreases as the aperture value increases.

The reason thereof is as follows. As the aperture value is closer to being open, it is more likely for the subject illuminance to be low. In such cases, there is a tendency that there is less high frequency component such as outline portions in the video signal and there is more noise. Since the high frequency component is reduced, even if an outline emphasis process is performed, its effect will not be eminent. Furthermore, when the S/N ratio is poor, i.e., there is a lot of noise, the noise component will be amplified, thus deteriorating the image quality. In particular, noise will become conspicuous in dark flat portions. Thus it is ensured that the outline emphasis gain value decreases as the aperture value increases.

The fourth parameter determination section 34 calculates an outline emphasis gain value in synchronization with the shutter speed.

Figure 3D:
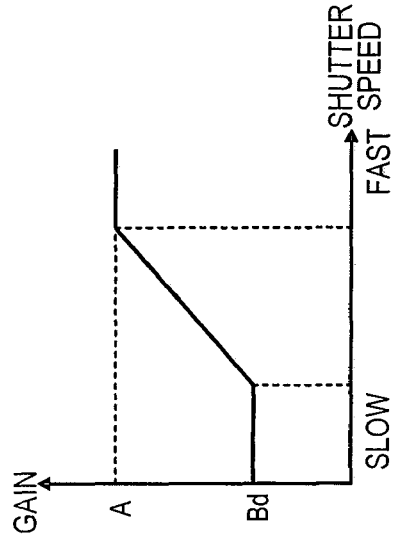
FIG. 3D is a diagram showing a relationship between the shutter speed and the gain value, which is retained in a fourth parameter determination section 34.

FIG. 3D shows a relationship between the shutter speed and the gain value, which is retained in the fourth parameter determination section 34. The fourth parameter determination section 34 determines an outline emphasis gain value so that the gain value decreases as the shutter speed is slower.

Basically, in the case of a very bright subject, the imaging control section 42 controls the iris 12 in the direction of becoming closed, and further increases the shutter speed, thus performing a control for limiting the light amount. Conversely, when the shutter speed is slow, it is likely that the subject illuminance is low. This is because, when the subject is dark, the shutter speed is to be slowed while opening the iris 12, thus to increase the integrated light amount. Since there is less high frequency component when the subject is dark, even if an outline emphasis process is performed, its effect will not be eminent, and under a poor S/N ratio, the noise component will be amplified, thus deteriorating the image quality. Therefore, as shown in FIG. 3D, it is ensured that the outline emphasis gain value decreases as the shutter speed is slower.

The fifth parameter determination section 35 calculates an outline emphasis gain value in synchronization with an AGC value.

Figure 3E:
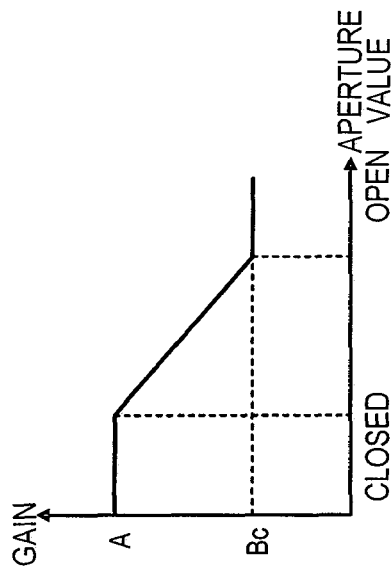
FIG. 3E is a diagram showing a relationship between the AGC value and the gain value, which is retained in a fifth parameter determination section 35.

FIG. 3E shows a relationship between, the AGC value and the gain value, which is retained in the fifth parameter determination section 35.

The higher the AGC value is, the lower the subject illuminance is. In such cases, there is a tendency that there is less high frequency component such as outline portions in the video signal and there is more noise. Therefore, as shown in FIG. 3E, it is ensured that the outline emphasis gain value decreases as the AGC value increases.

Regarding the values registered on the vertical axes of FIG. 3A to FIG. 3E, within each corresponding parameter, Ba to Be represent the highest level among the levels that are considered to keep the noise inconspicuous.

The selection section 36 selects the smallest among the respective outline emphasis gain values that have been determined by the first to fifth parameter determination sections 31 to 35. The reason for adopting the smallest gain value among the respective outline emphasis gain values is to minimize the amplification of unwanted signal components, such as noise and pseudo outlines, under all of the aforementioned conditions, i.e., zoom position information, aperture value information, amount-of-move information of the main body of the video signal processing apparatus 100, shutter speed information, and AGC gain value information.

The outline emphasis control section 45 outputs the selected outline emphasis gain value to the outline emphasis processing section 41 as an outline emphasis control signal. As shown in FIG. 2, the outline emphasis processing section 41 multiplies the outline component by this outline emphasis gain value, thus applying an outline emphasis process to the video signal.

Note that, in the case where the state of imaging changes incessantly, there is a possibility that the outline emphasis gain value selected by the selection section 36 may drastically fluctuate. This induces fluctuations in the sharpness of the outline portions of the same object, thus leading to an uncouth image quality. In order to avoid drastic fluctuations in the outline emphasis gain value, it is desirable for the selection section 36 to perform processing such as granting a time constant to the outline emphasis gain value that is output, or defining a range of change from an immediately previous value, and then output the outline emphasis gain value.

Figure 4:
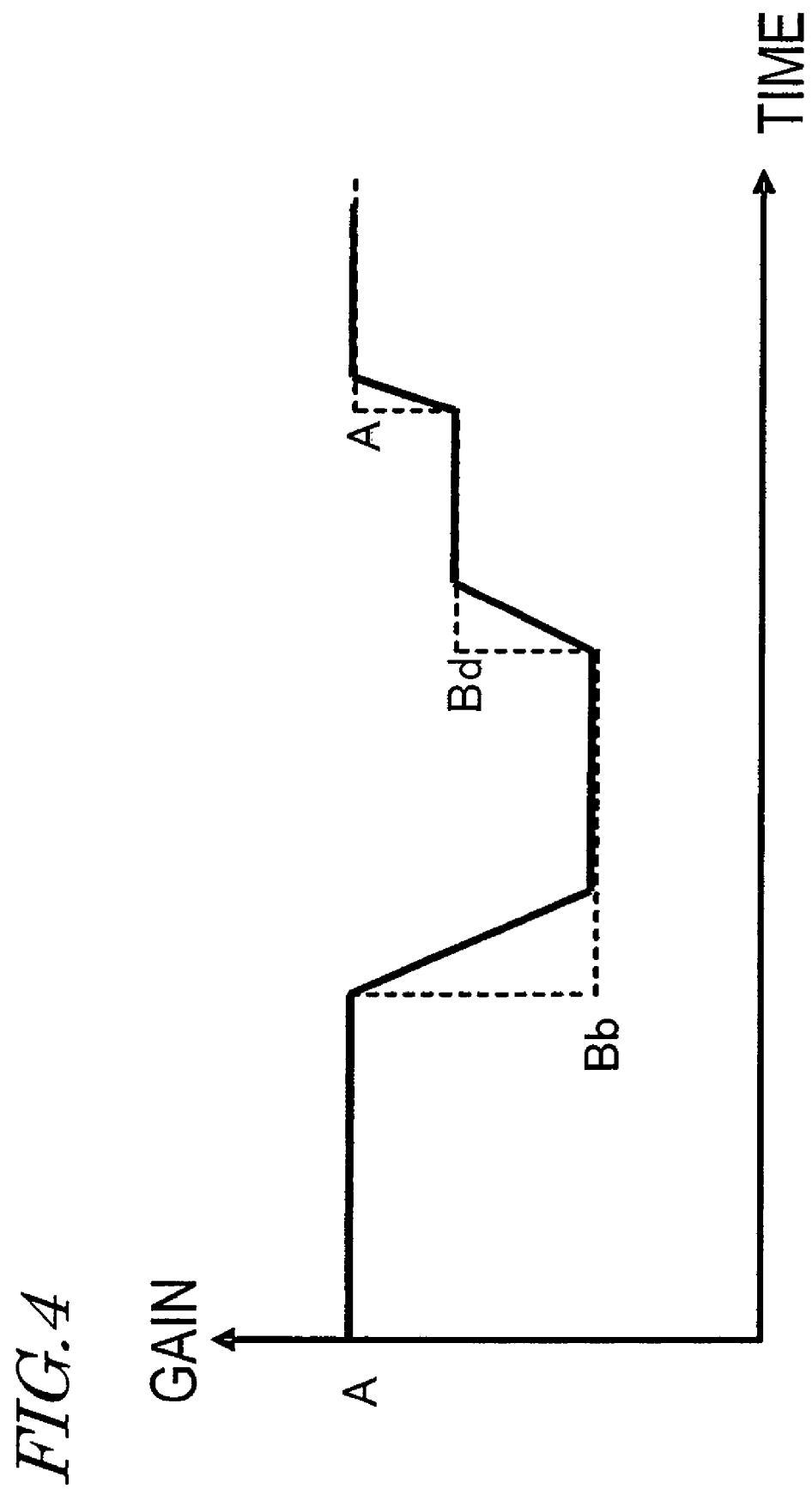
FIG. 4 is a diagram showing the response (outline emphasis gain value) of an output signal from a selection section 36 when a range of change is prescribed for the outline emphasis gain value.

FIG. 4 shows the response (outline emphasis gain value) of an output signal from the selection section 36 when a range of change is prescribed for the outline emphasis gain value. According to FIG. 4, as is shown by the dotted line, smallest gains are being selected that abruptly fluctuate from point to point in time; however, by prescribing a small range of change from an immediately previous gain value, a gentle response as shown by the solid line is actually obtained.

Note that it is not necessary to employ all of the aforementioned plurality of imaging control signals; it will be appreciated that only some of them may be used. Moreover, even when the same imaging control signals are used, different characteristics from the calculation characteristics of the outline emphasis gain values exemplified in FIGS. 3A-3E may be set. Moreover, the aforementioned examples of a plurality of imaging control signals are only exemplary; when other imaging control signals are added, a processing method similar to the above can be performed.

Figure 5:
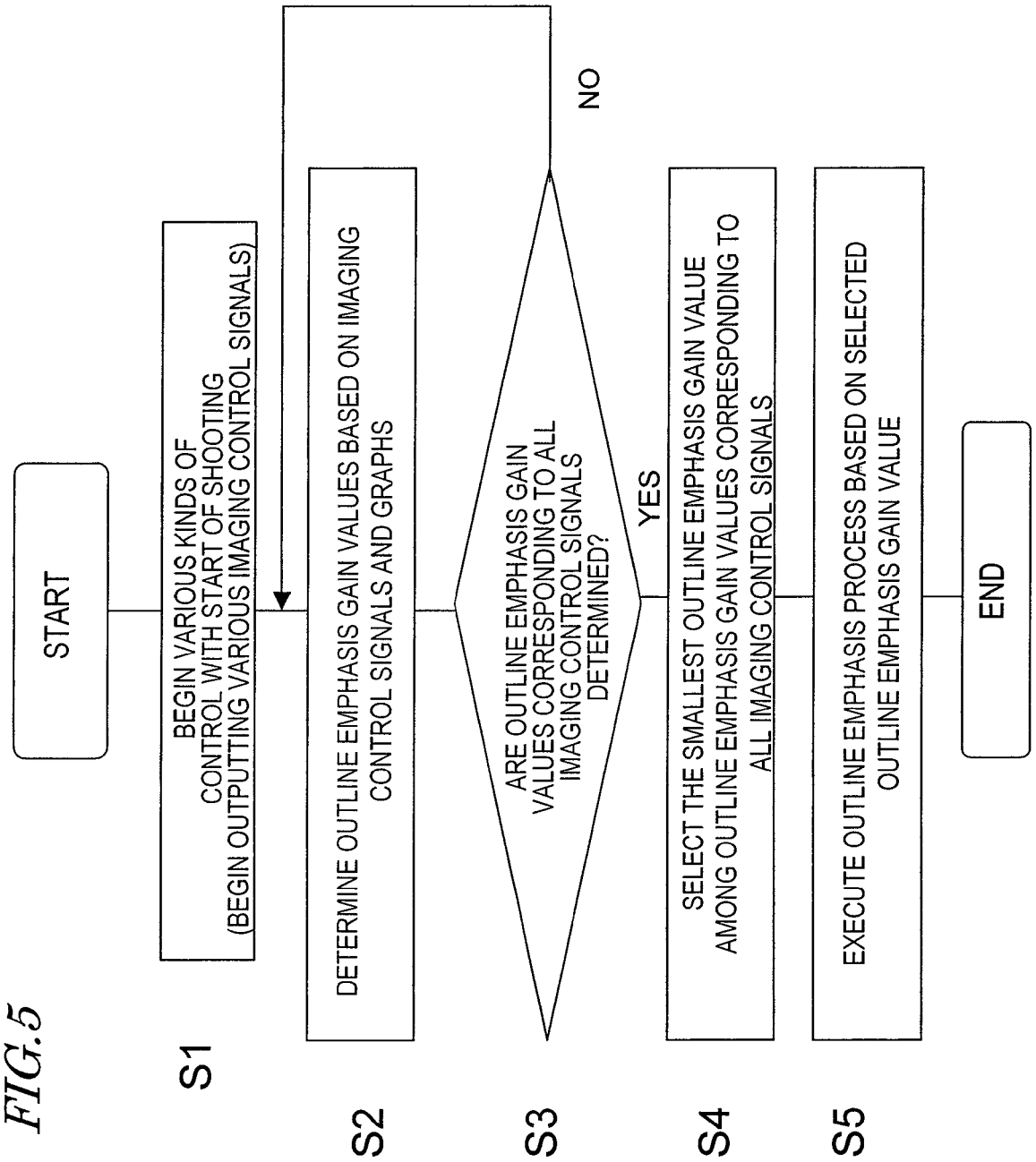
FIG. 5 is a flowchart showing a procedure of processing by the video signal processing apparatus 100.

FIG. 5 is a flowchart showing a procedure of processing by the video signal processing apparatus 100.

At step S1, when various kinds of control by the imaging control section 42 are begun as shooting is started, imaging control signals begin to be output.

At step S2, based on the imaging control signals received from the imaging control section 42 and on the respective graphs shown in FIGS. 3A-3E, the parameter determination means 31 to 35 determine outline emphasis gain values.

At step S3, it is determined whether all of the parameter determination means 31 to 35 have determined outline emphasis gain values corresponding to the imaging control signals or not. If the outline emphasis gain values have not been determined for all, the process returns to step S2 and is repeated until all of the parameter determination means 31 to 35 have finished determining outline emphasis gain values. If outline emphasis gain values have been determined for all, the process proceeds to step S4.

At step S4, the selection section 36 selects the smallest outline emphasis gain value among the outline emphasis gain values corresponding to all imaging control signals. The selected outline emphasis gain value is sent to the outline emphasis processing section 41.

At step S5, the outline emphasis processing section 41 performs an outline emphasis process by applying the received outline emphasis gain value.

Through the above processing, under various shooting conditions, an outline emphasis process can be performed which minimizes amplification of unwanted signal components such as noise and pseudo outlines.

Embodiment 2

Figure 6:
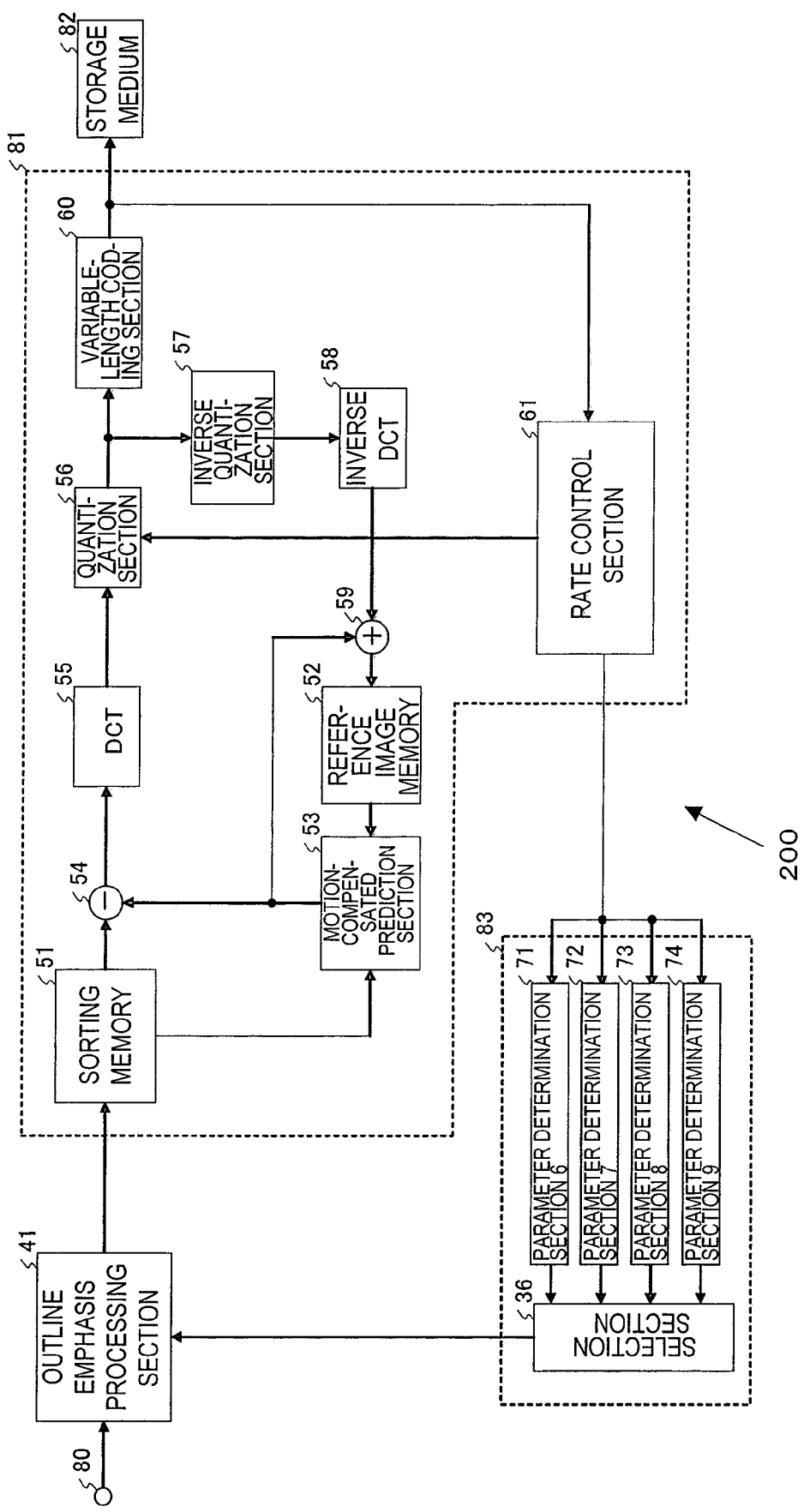
FIG. 6 is a block diagram showing the construction of a video signal processing apparatus 200 according to Embodiment 2.

FIG. 6 is a block diagram showing the construction of a video signal processing apparatus 200 according to the present embodiment.

The video signal processing apparatus 200 includes an outline emphasis processing section 41, an input terminal 80, an encoding section 81, a storage medium 82, and an outline emphasis control section 83.

Since the outline emphasis processing section 41 is as described in Embodiment 1, the descriptions thereof are omitted.

The encoding section 81 encodes a video signal so as to fit within a target recording bitrate, and records it onto a storage medium. The rate control section 61 is performing a control of the code amount at this time. Above all, it is assumed that the rate control section 61 performs a variable rate control (VBR).

The parameters which are used for the rate control are a quantization parameter, a resultant code amount, a cumulative error amount, and a target recording bitrate. Note that a "cumulative error amount" is determined as a difference between a recording capacity to be consumed at the target recording bitrate and a recording capacity which has been consumed at the actually-occurring code amount.

The encoding section 81 includes various constituent elements. Specifically, the encoding section 81 includes a sorting memory 51, a reference image memory 52, a motion-compensated prediction section 53, a subtracter 54, a DCT circuit 55, a quantization section 56, an inverse quantization section 57, an inverse DCT circuit 58, an adder 59, a variable-length coding section 60, and a rate control section 61.

The sorting memory 51 outputs encoded images which are sorted in the order of encoding. From an encoded image which is output from the sorting memory 51 and a reference image which is output from the reference image memory 52, the motion-compensated prediction section 53 performs a motion compensation, and generates a predictable image. The subtracter 54 determines an image difference between this predictable image and the encoded image, and outputs it to the DCT circuit 55. The image difference is subjected to an orthogonal transform by the DCT circuit 55, and is quantized by the quantization section 56 according to a quantization parameter which is supplied from the rate control section 61. The result thereof is supplied to the variable-length coding section 60, and also to the inverse quantization section 57. The data which is fed to the variable-length coding section 60 is variable-length encoded, and recorded onto the storage medium 82. On the other hand, the data which is fed to the inverse quantization section 57 is inverse quantized according to the aforementioned quantization parameter, subjected to an inverse orthogonal transform by the inverse DCT circuit 58, added up with the aforementioned predictable image, and is stored to the reference image memory. Note that only images which are selected for the reference image are stored to the reference image memory.

The outline emphasis control section 83 includes a selection section 36 and parameter control sections 71 to 74. The respective functions of the parameter determination sections 71 to 74 are as follows. Note that the information which is utilized by the parameter determination sections 71 to 74 to determine a gain value is obtained based on a signal which is output from the rate control section 61.

The sixth parameter determination section 71 an outline emphasis gain value in synchronization with a quantization parameter.

Figure 7A:
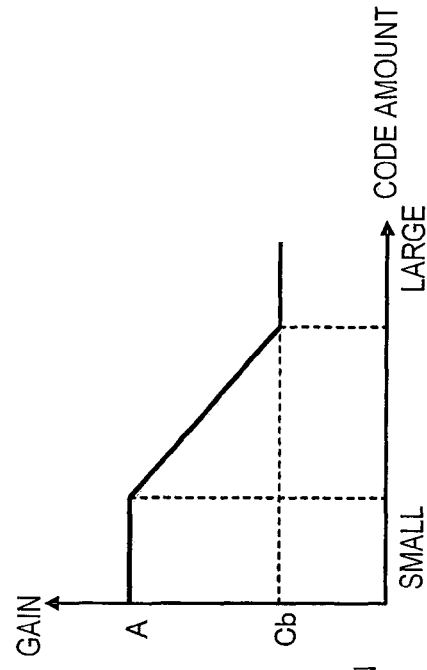
FIG. 7A is a diagram showing a relationship between the quantization parameter and the gain value, which is retained in a sixth parameter determination section 71.

FIG. 7A shows a relationship between the quantization parameter and the gain value, which is retained in the sixth parameter determination section 71. As the quantization parameter increases, block noise due to quantization errors increases. In order to prevent this, the outline emphasis gain should be as small as possible. Accordingly, as shown in FIG. 7A, the outline emphasis gain value is determined so that the gain value becomes smaller as the quantization parameter becomes larger.

The seventh parameter determination section 72 calculates an outline emphasis gain value in synchronization with a resultant code amount.

Figure 7B:
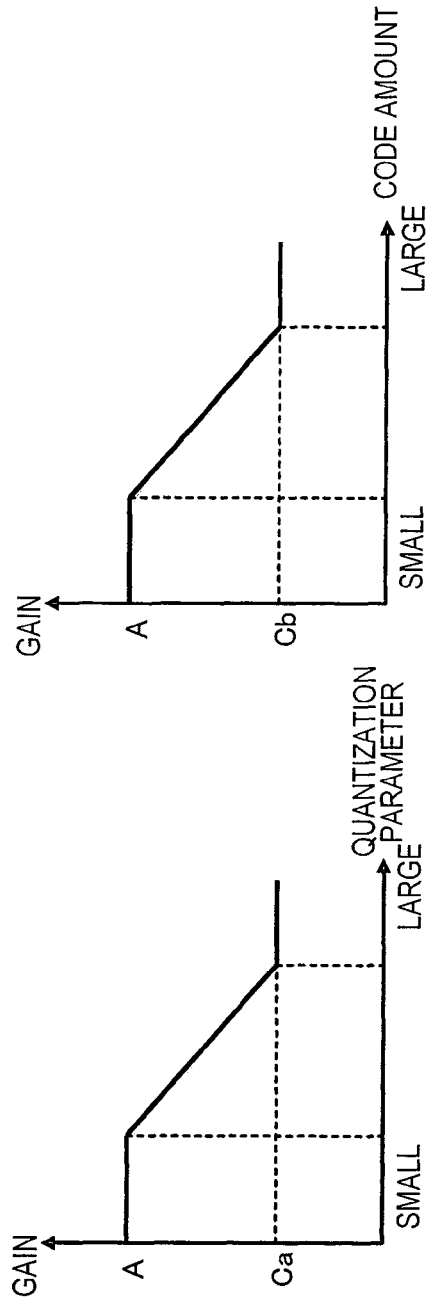
FIG. 7B is a diagram showing a relationship between the code amount and the gain value, which is retained in a seventh parameter determination section 72.

FIG. 7B shows a relationship between the code amount and the gain value, which is retained in the seventh parameter determination section 72. As the resultant code amount increases, more rate control for reducing the resultant code amount will be applied thereafter. Therefore, the outline emphasis gain should be as small as possible. Accordingly, as shown in FIG. 7B, the outline emphasis gain value is determined so that the gain value becomes smaller as the resultant code amount becomes larger.

The eighth parameter determination section 73 calculates an outline emphasis gain value in synchronization with the aforementioned cumulative error amount.

Figure 7C:
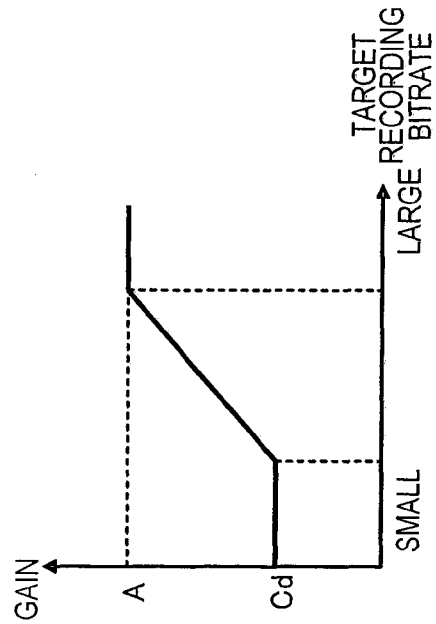
FIG. 7C is a diagram showing a relationship between the cumulative error amount and the gain value, which is retained in an eighth parameter determination section 73.

FIG. 7C shows a relationship between the cumulative error amount and the gain value, which is retained in the eighth parameter determination section 73. A large cumulative error amount means that a greater code amount is being consumed than the target recording rate. If the cumulative error amount increases, a rate control for reducing the resultant code amount will be performed thereafter, and therefore the outline emphasis gain should be as small as possible. Accordingly, as shown in FIG. 7C, the outline emphasis gain value is determined so that the gain value becomes smaller as the cumulative error amount becomes larger.

The ninth parameter determination section 74 calculates an outline emphasis gain value in synchronization with a target recording bitrate.

Figure 7D:
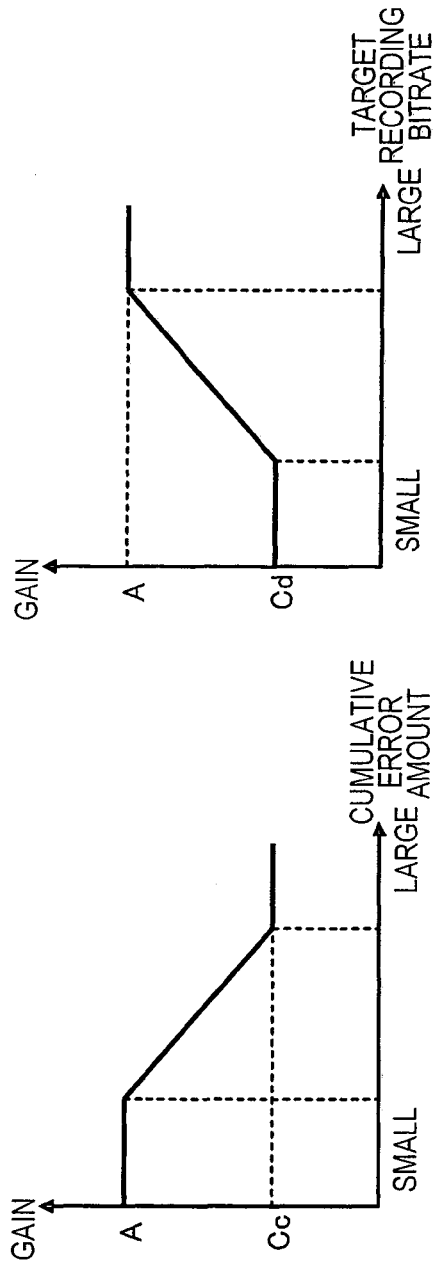
FIG. 7D is a diagram showing a relationship between the target recording bitrate and the gain value, which is retained in the eighth parameter determination section 73.

FIG. 7D shows a relationship between the target recording bitrate and the gain value, which is retained in the eighth parameter determination section 73. When the target recording bitrate is small, the quantization parameter will naturally be large, and therefore the outline emphasis gain should be as small as possible. Accordingly, as shown in FIG. 7D, the outline emphasis gain value is determined so that the gain value becomes smaller as the target recording bitrate becomes smaller.

Regarding the values registered on the vertical axes of FIGS. 7A to 7D, within each corresponding parameter, Ca to Cd represent the highest level among the levels that are considered to keep the noise inconspicuous.

The selection section 36 selects the smallest among the respective outline emphasis gain values that have been determined by the sixty to ninth parameter determination sections according to the above methods. The outline control section 45 outputs the selected outline emphasis gain value to the outline emphasis processing section 41. As shown in FIG. 2, the outline emphasis processing section 41 multiplies the outline component by this outline emphasis gain value, thus applying an outline emphasis process to the video signal.

Note that, in the case where the ease of encoding changes incessantly, there is a possibility that the outline emphasis gain value selected by the selection section 36 may drastically fluctuate. This induces fluctuations in the sharpness of the outline portions of the same object, thus leading to an uncouth image quality. In order to avoid this, it is desirable for the selection section 36 to perform processing such as granting a time constant to the outline emphasis gain value that is output, or defining a range of change from an immediately previous value, and then output the outline emphasis gain value. This responsiveness operation is the same as in Embodiment 1.

Note that it is not necessary to employ all of the aforementioned plurality of pieces of encoding information; it will be appreciated that only some of them may be used. Moreover, even when the same encoding information is used, different characteristics from the calculation characteristics of the outline emphasis gain values exemplified in FIGS. 7A-7D may be set. Moreover, the aforementioned examples of a plurality of pieces of encoding information are only exemplary; when other pieces of encoding information are added, a processing method similar to the above can be performed.

The operation of the video signal processing apparatus 200 according to the present embodiment is substantially the same as in FIG. 5, which relates to Embodiment 1. The difference is that a signal which is output from the rate control section 61 is used instead of the "imaging control signals" in FIG. 5.

Embodiment 3

Figure 8:
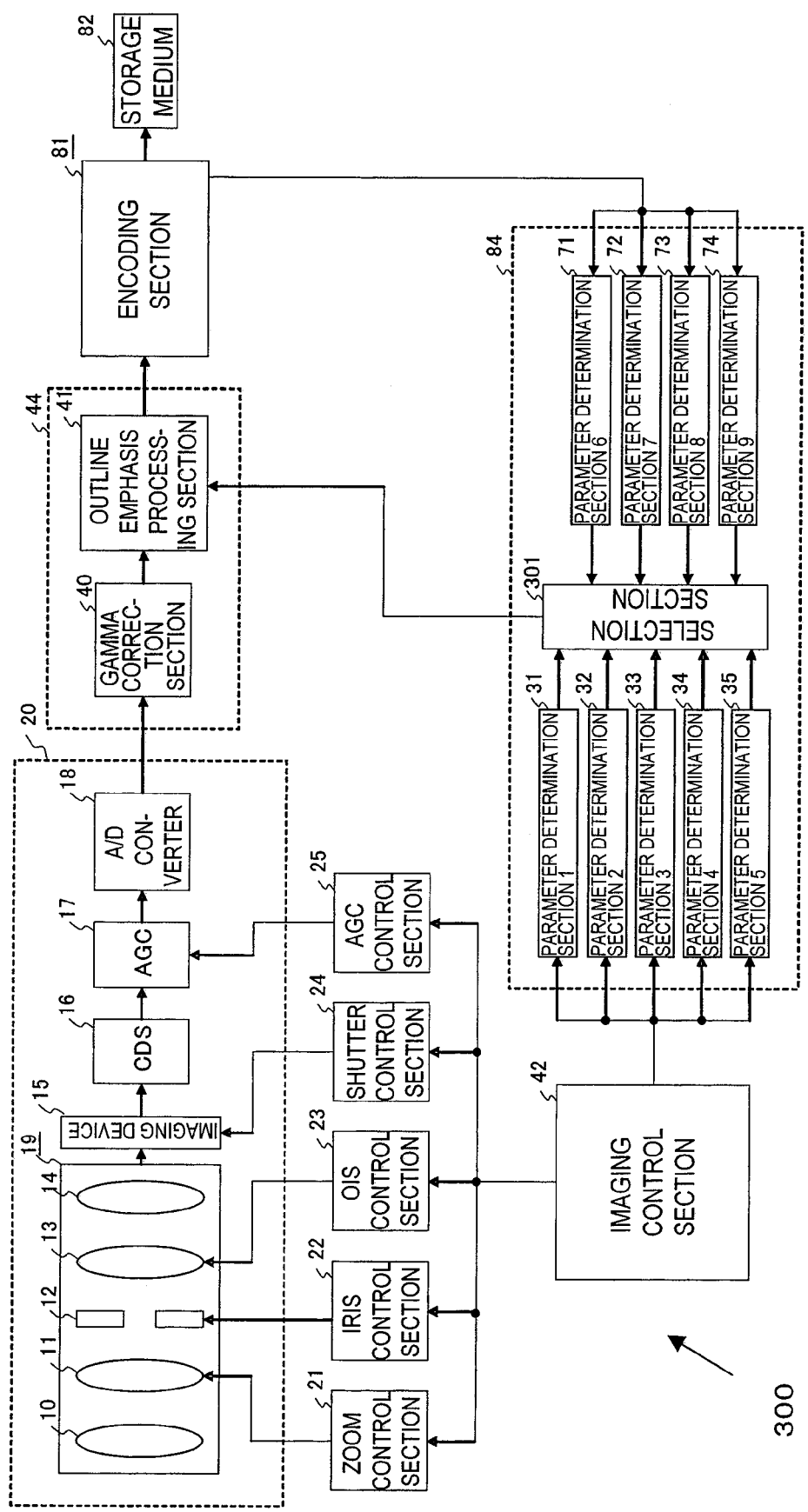
FIG. 8 is a block diagram showing the construction of a video signal processing apparatus 300 according to Embodiment 3.

FIG. 8 is a block diagram showing the construction of a video signal processing apparatus 300 according to the present embodiment. The video signal processing apparatus 300 shown in FIG. 8 has a construction which combines the video signal processing apparatus 100 of Embodiment 1 and the video signal processing apparatus 200 of Embodiment 2. The constituent elements having like functions are denoted by like reference numerals as used in FIG. 1 and FIG. 6, and the descriptions thereof are omitted.

The outline emphasis control section 84 include parameter determination sections 31 to 35 and 71 to 74. The Each parameter determination sections operate as described in Embodiment 1 and Embodiment 2 to each determine an outline emphasis gain value.

The selection section 301 selects the smallest gain value among the outline emphasis gain values determined by the parameter determination sections 31 to 35 and 71 to 74. The outline emphasis control section 84 outputs the selected outline emphasis gain value to the outline emphasis processing section 41. As shown in FIG. 2, the outline emphasis processing section 41 multiplies the outline component by this outline emphasis gain value, thus applying an outline emphasis process to the video signal.

Note that, in the case where the state of imaging or the ease of encoding changes incessantly, there is a possibility that the outline emphasis gain value selected by the selection section 301 may drastically fluctuate. This induces fluctuations in the sharpness of the outline portions of the same object, thus leading to an uncouth image quality. In order to avoid this, it is desirable for the selection section 301 to perform processing such as granting a time constant to the outline emphasis gain value that is output, or defining a range of change from an immediately previous value, and then output the outline emphasis gain value. This responsiveness operation is the same as in Embodiment 1.

Note that it is not necessary to employ all of the aforementioned plurality of imaging control signals and encoding information; it will be appreciated that only some of them may be used. Moreover, even when the same imaging control signals and encoding information are used, different characteristics from the calculation characteristics of the outline emphasis gain values exemplified in FIGS. 3A-3E and FIGS. 7A-7D may be set. Moreover, the aforementioned examples of a plurality of imaging control signals and encoding information are only exemplary; when other imaging control signals and encoding information are added, a processing method similar to the above can be performed.

In Embodiments 1 to 3, embodiments of the present invention are described in which an outline emphasis gain value is used as an outline emphasis control signal. Otherwise, a filter factor to be applied to a filter which constitutes the outline component extraction section 91 may be used as the outline emphasis control signal.

In this case, a plurality of filter factors are provided in advance, each being a different factor, whereby the frequency characteristics of the filter are varied. In advance, these factors may be ordered, from those which enhance the level of outline emphasis to those which lessen it; an ordinal number which is in accordance with the input control signal may be determined in each parameter determination section; and the ordinal number of the weakest characteristics may be selected by the selection section 301. For example, if smaller numbers are to be given to weaker factors, the selection section 301 will select the smallest number. The objective of the present invention can be attained in this manner.

Figure 9:
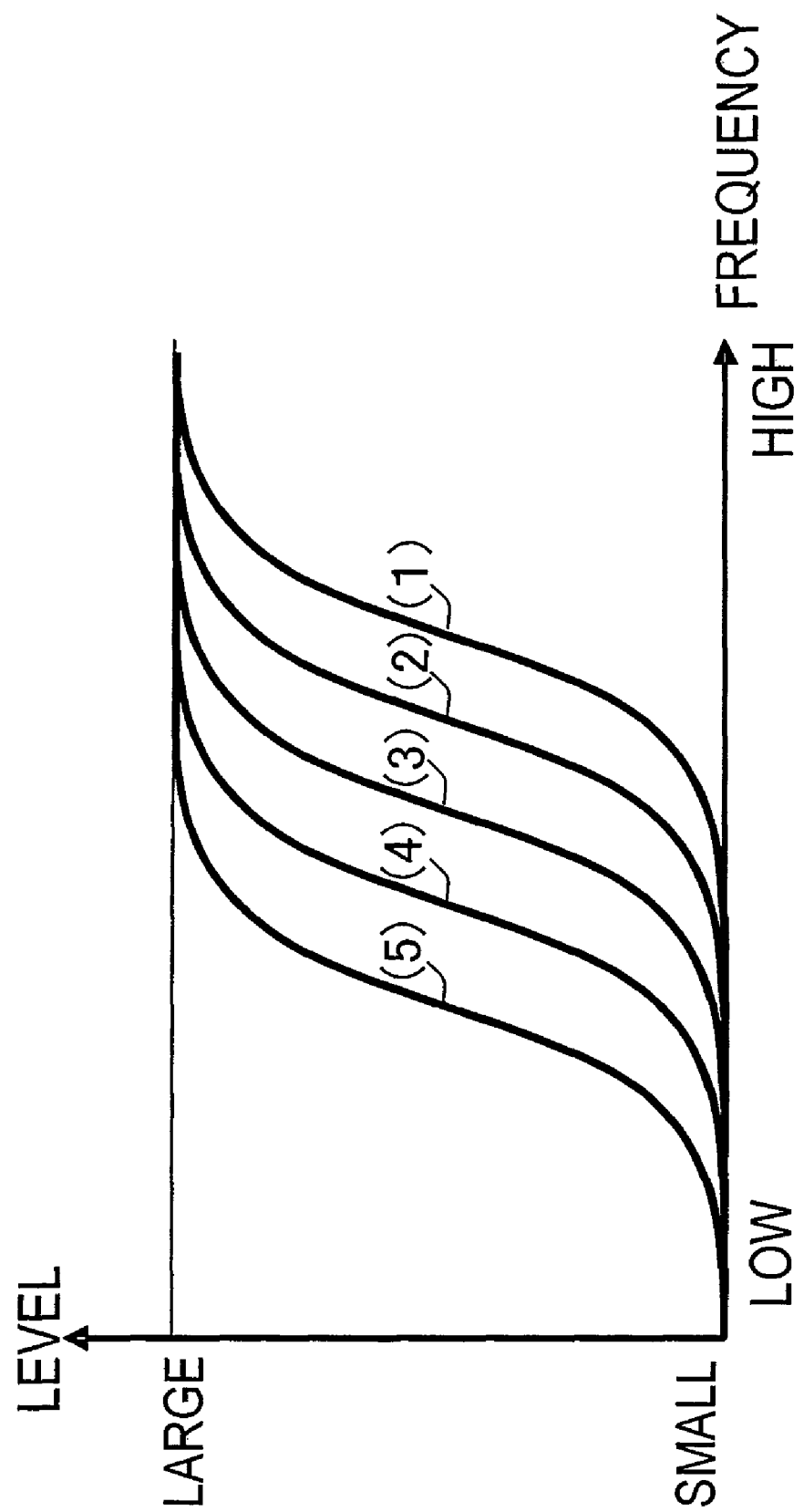
FIG. 9 is a diagram showing frequency characteristics based on a plurality of filter factors to be applied to a highpass filter which is included in an outline component extraction section 91.
Figure 10:
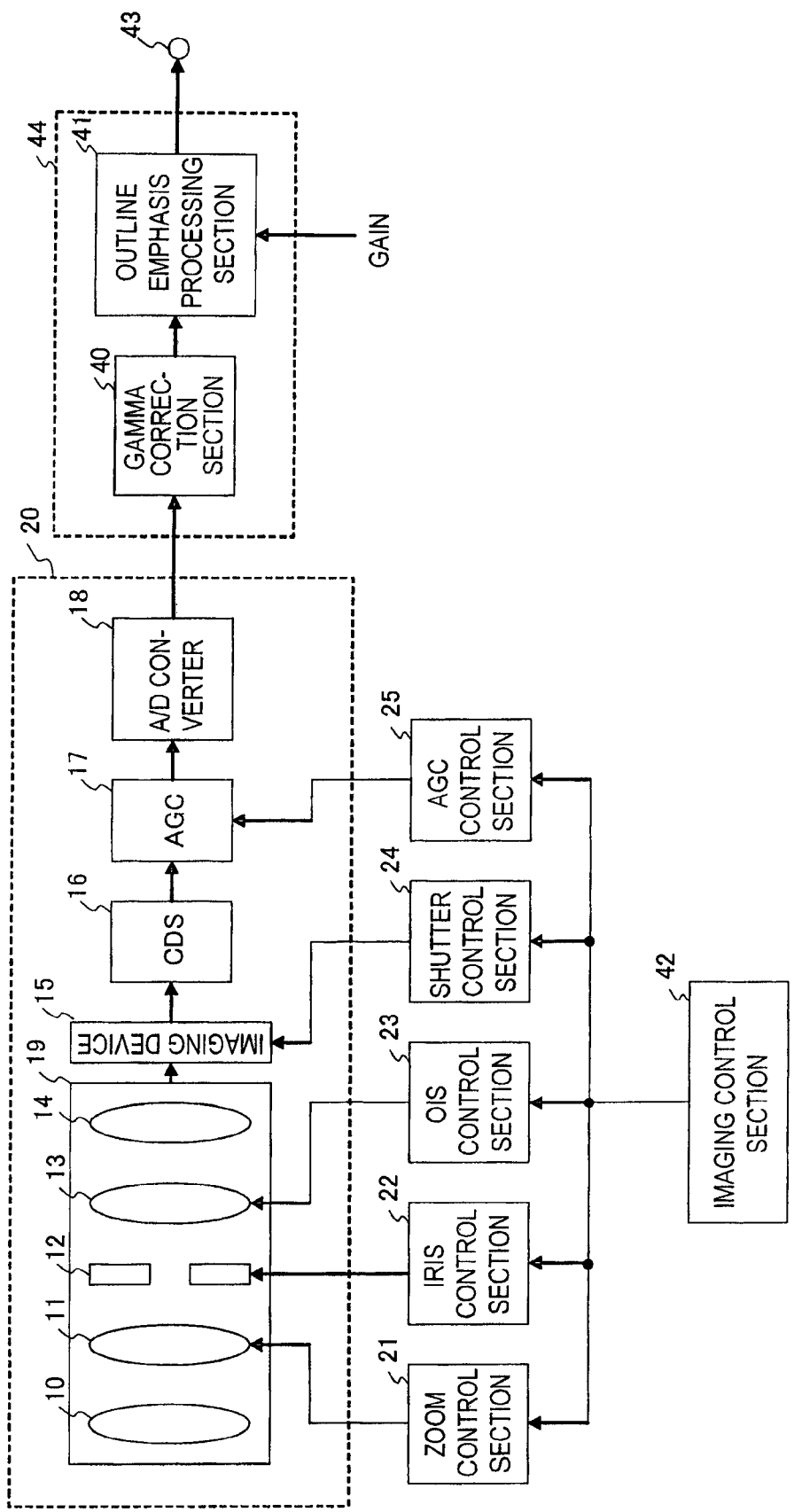
FIG. 10 is a construction diagram showing the construction of a conventional imaging apparatus.
Figure 11:
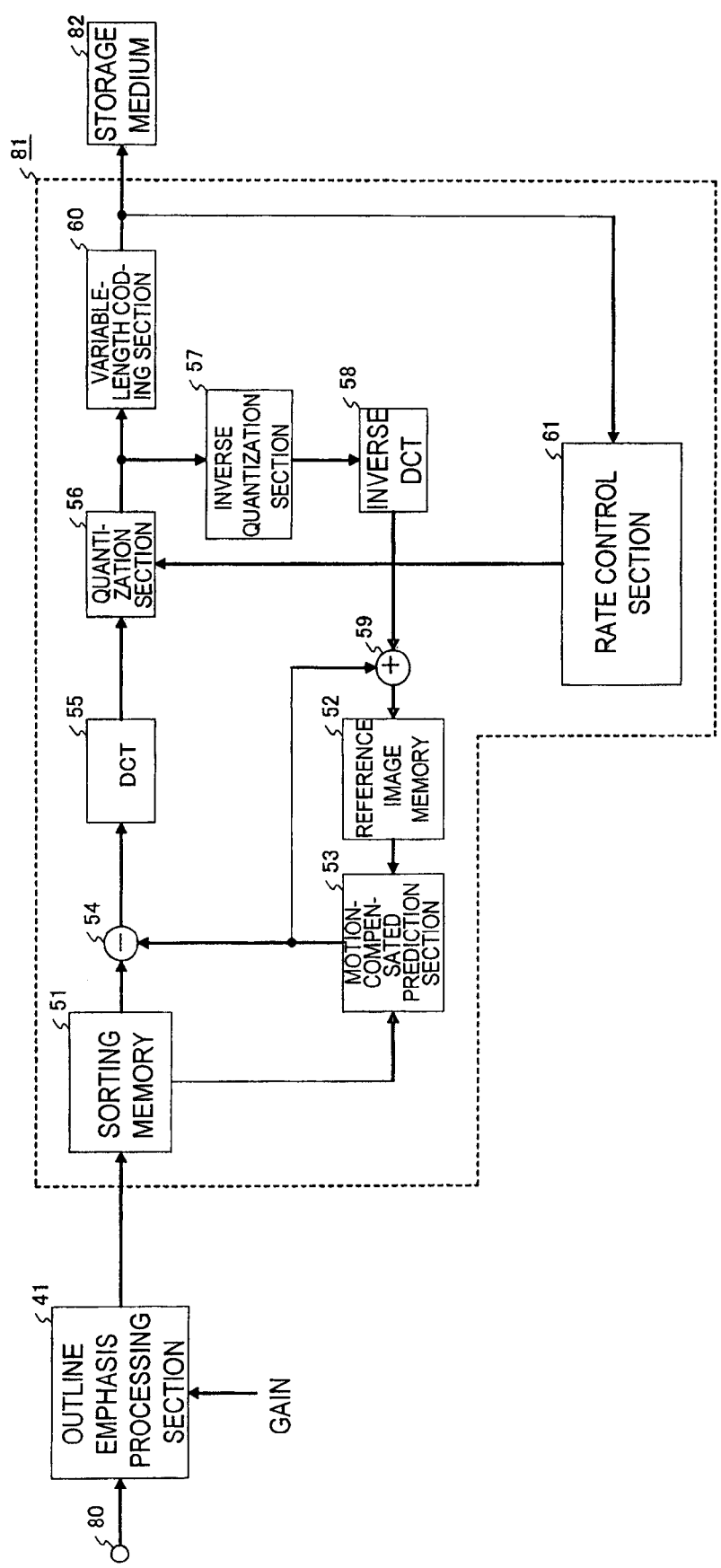
FIG. 11 is a diagram showing the construction of an encoding section 81 of a conventional imaging apparatus.

FIG. 9 shows frequency characteristics based on a plurality of filter factors to be applied to a high-pass filter which is included in the outline component extraction section 91. Numbers (1) to (5) are assigned to the respective frequency characteristics in advance, under the definition that the smaller the number, the weaker the level of outline emphasis. One of these numbers may be adopted for each outline emphasis parameter, and the smallest number may be selected by the selection section. Note that other constructions are possible for the outline component extraction section 91. Constructions employing a band-pass filter or a low-pass filter may be used, and by selecting factors which are suited to the filter used, a similar processing method to the above can be performed.

Embodiments of the present invention have been described above.

Although the above embodiments illustrate examples where a plurality of kinds of imaging control information are used, only one kind may be used. The reason is that, even with one kind of imaging control information, a gain value that allows noise to be reduced can be selected by using FIG. 3A and the like.

Note that, in FIGS. 3A-3E and FIGS. 7A-7D relating to the respective above embodiments, the information on the horizontal axis is output from the imaging control section 42 as a digital value. For example, the "zooming speed" in FIG. 3A is supplied to the parameter determination section 31 and the zoom control section 21 as normalized 8-bit digital information. This is a value representing the zooming speed. However, the zooming speed itself may also be used.

Moreover, the shapes of the graphs of FIGS. 3A-3E and FIGS. 7A-7D are exemplary, and the positions where the bends occur may be determined as appropriate. For example, in the case where the horizontal axis is represented as an 8-bit digital value (0 to 255 in the decimal system), one bend may occur at a position which is $\frac{1}{3}$ across the range, and another bend at a position which is $\frac{2}{3}$ across. The user may also be allowed to set these positions. Note that, instead of a graph form, it may be expressed as a mathematical function (mathematical formula) which allows a gain value to be determined when information on the horizontal axis is supplied as an input.

In the descriptions of the embodiments, the descriptions related to Embodiments 2 and 3, in particular, illustrate the outline emphasis processing section 41 and the encoding section 81 as separate constituent elements. However, they may be combined as one, and implemented as a single chip.

Moreover, in connection with the description of Embodiment 3, only one outline emphasis processing section 41 is provided in FIG. 8. However, two outline emphasis processing sections 41 may be provided. One of them may receive a video signal from the imaging section 20 and subject it to an outline emphasis process, whereas the other may apply a further outline emphasis process to the video signal that has experienced the aforementioned outline emphasis process. At the time of videorecording to the storage medium 82, a video signal which has been processed by the two outline emphasis processing sections 41 is used. On the other hand, in the case where real-time video images are to be displayed on a monitor (not shown) while not performing videorecording, a video signal which is obtained by subjecting a signal from the imaging section 20 to the outline emphasis processes is used.

The operation of the video signal processing apparatus 300 according to the present embodiment is substantially the same as in FIG. 5, which relates to Embodiment 1. The difference is that "a signal which is output from the rate control section 61 in the encoding section 81" is used in addition to the "imaging control signals" in FIG. 5.

As described above, by using imaging control information, a video signal processing apparatus according to the present invention is able to perform an optimum outline emphasis process under any shooting condition. Moreover, by using a plurality of pieces of encoding information, an appropriate outline emphasis process can be performed without inducing deteriorations in image quality due to encoding. Moreover, it is possible to perform an optimum outline emphasis process that supports any imaging condition and encoding state. Thus, an effect of being able to always attain an improvement in image quality is obtained. Moreover, since this can be realized by a simple method with a very small processing amount, even if the kinds of imaging control information that are used for the processes are increased, it can still be introduced without a cost increase in circuit scale, memory amount, and the like.

Thus, the present invention is very useful for various types of video signal processing apparatuses and software to be used for digital camcorders, video recorders, and the like.

What is claimed is:

1. A video signal processing apparatus comprising:
an imaging section for imaging a subject to generate a video signal;
an outline emphasis processing section for emphasizing an outline portion within the imaged image, the outline emphasis processing section detecting the outline portion based on the video signal which is output from the imaging section and emphasizing the outline portion by using an externally-input outline emphasis control signal;
an imaging control section for generating at least one imaging control signal for controlling an imaging operation of the imaging section; and
an outline emphasis control section for generating an outline emphasis control signal for determining a level of emphasizing the outline portion in accordance with the at least one imaging control signal, and transmitting the outline emphasis control signal to the outline emphasis processing section,
wherein the outline emphasis control section includes:
parameter determination sections for generating outline emphasis parameters respectively corresponding to the at least one imaging control signal; and
a selection section for, from among the outline emphasis parameters, selecting an outline emphasis parameter having characteristics that cause a weakest level of emphasizing the outline portion, and generating the outline emphasis parameter as the outline emphasis control signal.

2. The video signal processing apparatus of claim 1, wherein the imaging control section generates as the imaging control signal as a signal for controlling one or more of a zoom position, a shutter speed, an aperture value, an automatic gain value, an amount of move of an imaging apparatus main body.

3. The video signal processing apparatus of claim 1, further comprising an encoding section for applying a low bit rate coding to the video signal, wherein,
the parameter determination sections further generate the outline emphasis parameters for changing a level of emphasizing the outline portion in accordance with the at least one kind of encoding information representing an encoding state of the encoding section.

4. The video signal processing apparatus of claim 1, wherein,
the outline emphasis processing section adds to the video signal a product of multiplying a component of the video signal that corresponds to the detected outline portion by a gain value; and the outline emphasis control section selects a smallest gain value among the gain values respectively generated by the parameter determination sections.

5. The video signal processing apparatus of claim 1, wherein,
- the outline emphasis processing section includes a filter for detecting the outline portion based on the video signal and filter factors;
- the outline emphasis processing section adds to the video signal a product of multiplying a component of the video signal that corresponds to the detected outline portion by a gain value; and
- the outline emphasis control section generates as the outline emphasis signal a filter factor that causes a weakest level of outline emphasis.

6. The video signal processing apparatus of claim 1, wherein,
- the at least one imaging control signal is a zoom position signal;
- the imaging control section outputs the zoom position signal to the imaging section in order to control a zoom operation of the imaging section; and
- the parameter determination section calculates a current zooming speed from the zoom position signal, and generates an outline emphasis parameter which lessens the level of outline emphasis as the zooming speed is faster.

7. The video signal processing apparatus of claim 1, wherein,
- the at least one imaging control signal is an amount of move of an apparatus main body;
- the imaging control section outputs the amount of move signal of the apparatus main body to the imaging section in order to control a handshake correction operation of the imaging section; and
- the parameter determination section generates an outline emphasis parameter which lessens the level of outline emphasis as the amount of move of the apparatus main body is faster.

8. The video signal processing apparatus of claim 1, wherein,
- the at least one imaging control signal is an aperture value of an iris;
- the imaging control section outputs the aperture value to the imaging section in order to control an aperture level of the iris of the imaging section; and
- the parameter determination section generates an outline emphasis parameter which lessens the level of outline emphasis as the aperture value is closer to open.

9. The video signal processing apparatus of claim 1, wherein,
- the at least one imaging control signal is a shutter speed value;
- the imaging control section outputs a shutter speed value to the imaging section in order to control a shutter speed of the imaging section; and
- the parameter determination section generates an outline emphasis parameter which lessens the level of outline emphasis as the shutter speed is slower.

10. The video signal processing apparatus of claim 1, wherein,
- the at least one imaging control signal is an automatic gain value;
- the imaging control section outputs an automatic gain value to the imaging section in order to control an imaging section of the automatic gain amount; and
- the parameter determination section generates an outline emphasis parameter which lessens the level of outline emphasis as the automatic gain value is larger.

* * * * *